Patented Feb. 13, 1951

2,541,152

UNITED STATES PATENT OFFICE 2,541,152

N-VINYL ALKYLENE UREAS AND POLYMERS THEREOF

Theodore L. Cairns, Newark, Del., assignor to E. I. du Pont de Nemours & Company, Wilmington, Del., a corporation of Delaware No Drawing. Application December 7, 1948, Serial No. 64,040

8 Claims. (Cl. 260—88.3)

This invention relates to new organic compounds and to their preparation and polymerization.

Polymeric materials which are of extensive commercial use can be classified in general as either obtained by the addition polymerization of monomers such as vinyl and vinylidene compounds, or by the condensation with elimination of water or a similar molecule from different compounds, such as the condensation of phenol or urea with aldehydes. Polymeric materials obtained by these different processes are different with respect to physical properties upon which their utility depends. Thus, many of the vinyl and vinylidene polymers are thermoplastic while the phenol- or urea-formaldehyde types are thermosetting and thereby transformed into insoluble materials.

This invention has as an object the production of new and useful organic compounds. A further object is the production of polymeric materials which combine the above mentioned advantages of the polymers obtained by addition polymerization and of the polymers obtained by condensation polymerization. Further objects reside in methods for obtaining these new organic compounds and polymerization products thereof. Other objects will appear hereinafter.

The new compounds described herein are N-vinyl ureas and are obtained by the action of acetylene on a urea which is selected from the group consisting of ethyleneurea and propyleneurea.

When ethyleneurea is employed the resulting N-vinyl urea is represented by the formula:

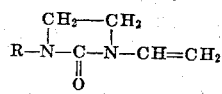

where R is selected from the group consisting of —H and —CH=CH$_2$. When R is H, the compound is N-vinylethyleneurea and when R is CH=CH$_2$, the compound is N,N'-divinylethyleneurea.

Generally the reaction of acetylene with a urea, such as N-ethyleneurea, is effected under superatmospheric pressure and in the presence of a basic catalyst, e. g., an alkali metal catalyst, such as potassium. The vinyl ureas thus obtained may be polymerized by the reaction with an aldehyde and/or by addition polymerization under the initiatory influence of a polymerization catalyst.

The following examples in which the parts given are by weight further illustrate the practice of this invention.

Example I

In to a pressure vessel were charged 160 parts of anhydrous thiophene-free benzene, 40 parts of ethyleneurea and 1.5 parts metallic potassium. The vessel was closed, cooled in Dry Ice, evacuated to about 15 mm., pressured with acetylene to about 100 lbs./sq. in., again evacuated followed by pressuring a second time with acetylene to 100 lbs./sq. in. The pressure vessel was then put in a shaker box equipped with heating coil and heated with vigorous agitation until the temperature inside the vessel reached 125° C. At this point the acetylene pressure was raised to 190 lbs./sq. in. and with the temperature maintained at 125° C., the vessel was repressured as necessary to maintain a pressure range of 160–220 lbs./sq. in. As judged by the drop in pressure there was a steady absorption of acetylene for the entire reaction period of 16 hours. After cooling the vessel to room temperature excess pressure was released to the atmosphere, the vessel opened and the reaction mixture discharged. After stripping the benzene solvent, the residue was distilled under reduced pressure. The fraction boiling at 82–84° C./1 mm. was 12.5 parts and the fraction boiling at 86–186° C./2 mm. (mostly at 130–35°/2 mm.) was 13.0 parts. The products obtained from a similar run were combined with the two fractions described above and carefully refractionated. N,N'-divinylethyleneurea distilled at 120–2°/11 mm. and after one recrystallization from aqueous methanol melted sharply at 65° C. and had the following analysis:

Calc'd for $C_7H_{10}ON_2$: C, 60.8; H, 7.3; N, 20.2.
Found: C, 61.0; H, 7.4; N, 20.1.

The fraction distilling at 150–163°/3–4 mm. was N-monovinyl ethyleneurea. It had the following analysis:

Calc'd for $C_5H_8ON_2$: C, 53.6; H, 7.2; N, 24.7.
Found: C, 53.4; H, 7.5; N, 24.3.

A portion of the N,N'-divinylethyleneurea containing 5% of azodicyclohexanecarbonitrile was heated at 90–95° C. for 30 minutes. The clear light yellow solution gradually became very viscous and finally solidified. The solid was infusible on a copper block heated to 300°, indicating that polymerization with the accompanying crosslinking had occurred. The polymer had the following analysis.

Calc'd for $(C_7H_{10}ON_2)_x$: N, 20.2.
Found: N, 19.4.

Five parts of N-monovinylethyleneurea and 0.025 part of alpha,alpha'-azodiisobutyronitrile were placed in a container and heated to 60° C. for three hours and then heated for 15 hours at 100° C. At the end of this time the fluid melt had been converted to an extremely viscous liquid which was solid at room temperature. The polymeric amide was soluble in dioxane and gave a slightly turbid solution in water.

Example II

Into a pressure vessel the following charge was placed: 1 part metallic potassium, 43 parts of ethyleneurea and 180 parts of tetrahydrofuran. The vessel was closed, pressured with acetylene and heated to 120° C. for 16 hours with agitation. The acetylene pressure was maintained at about 220 lbs./sq. in. The acetylene absorption was approximately 40 parts. After cooling and opening the vessel, the tetrahydrofuran was removed by evaporation at 100° C. The residual product was subjected to distillation at 255° C. at 1 mm. By fractional distillation there was obtained 6 parts of monovinylethyleneurea which melted at 78–79.5° C., 19 parts of divinylethyleneurea and 26 parts of residue.

Example III

The charge indicated in Example II was heated at 80° C. for 24½ hours under an acetylene pressure of 260 lbs./sq. in. The acetylene absorption was about 31 parts. The reaction product was neutralized with 1 part of formic acid and distilled. Fractional distillation gave 3.8 parts of divinylethyleneurea, about 15.5 parts of monovinylethyleneurea and 9.5 parts of residue.

One part of the N-vinylethyleneurea was dissolved in about 4 parts of anhydrous ethanol and 0.01 part of alpha,alpha'-azodiisobutyronitrile added. After heating at 70° C. for 2.3 hours, the polymer was separated by a centrifuge and washed with ether. A total of 0.6 part of polymer was obtained which was soluble in water to form a solution which gelled on standing.

The polymerization of N-vinylethyleneurea in aqueous solutions is advantageously carried out by keeping the media basic with ammonium hydroxide. A mixture of 1 part of N-vinylethyleneurea, 5 parts of 5% ammonium hydroxide, 1 part methanol and 0.01 part of alpha,alpha'-azobis-(alpha,gamma-dimethyl-gamma-methoxyvaleronitrile) was maintained at 28° C. for 20 hours then poured into about 80 parts of absolute ethanol to precipitate the polymer in 93% yield. This polymer was water soluble and did not gel whereas polymers prepared in unbuffered neutral aqueous systems as well as those buffered with sodium acetate formed gels. Aqueous solutions of poly-N-vinylethyleneurea are stable at pH of 8 or higher. Acidification of such solutions brings about immediate gelation.

To a water solution of the monomeric or polymeric N-vinylethyleneurea, formaldehyde was added. Polymerizations were effected in each case either by heating or by the addition of small amounts of acids such as para-toluene sulfonic acid or citric acid.

By replacing the ethyleneurea used in the foregoing examples with propylene urea the corresponding N-monovinylpropyleneurea and N,N'-divinylpropyleneurea and their polymers are obtained.

The formation of the vinyl or divinyl substituted urea is effected by direct reaction with acetylene under basic conditions, e. g., under a pH above 7. Basic catalysts that may be used include the alkali metals, alkali metal hydroxides or salts of weak organic acid, such as potassium metal, sodium or potassium hydroxide, potassium carbonate, potassium acetylide or the sodium or potassium salts of the urea. The amount of basic catalyst generally varies from 0.1 to 10% by weight.

Solvents which are non-reactive with the reactants or reaction product are useful in the preparation of the vinylureas. Such solvents include water, benzene, tetrahydrofuran, tetralin, etc. The amount of solvent may vary within wide limits, e. g., from 1 to 10 parts per part of the urea. For ureas which are liquid under the reaction conditions, the presence of added solvent is unnecessary.

The pressures used in carrying out the reaction may range from atmospheric up to 750 lbs./sq. in. or higher. Preferably acetylene in an excess of that calculated for the reaction is present at superatmospheric pressure, suitably at 30 to 500 lbs./sq. in. The temperature and time for the reaction are interdependent variables and may be varied particularly to give mono- or divinyl derivatives in certain instances. In general, times of from 1 to 48 hours at temperatures of from 75–200° C. may be used, although the temperature may be lower, e. g., 30° C. up to the decomposition temperature of the urea or reaction product. High temperatures are generally avoided in view of the tendency of the vinylureas to polymerize.

The vinylureas obtained by the process of this invention are polymerizable compositions. Polymerization is best effected by the use of free-radical type catalysts, i. e., compounds which under the conditions of reaction are a source of free radicals. Representative catalysts include the peroxy compounds, such as benzoyl peroxide, acetyl peroxide, diethyl peroxide, aliphatic azo compounds such as alpha,alpha'-azodiisobutyronitrile, organo-metallic compounds, etc. The polymerization can be carried out under a wide range of conditions, which are chosen for a specific catalyst, vinylurea, as well as the properties desired in the polymer. The use of aldehydes, such as formaldehyde, with vinylureas which contain hydrogen on the urea nitrogens gives rise to a separate type of polymerization, namely, a condensation polymerization. Such vinyl compounds have the unique property of being polymerizable in two stages to polymers of different properties, and to be convertible to insoluble polymers. These two stages of polymerization for N-vinylureas having at least one urea-amido hydrogen may be carried out in either of the following possible order: (1) the compounds may be subjected to addition polymerization conditions, i. e., contacted with a free-radical yielding catalyst such as peroxy catalyst to effect addition polymerization of the vinyl group followed by reaction of the polymer with an aldehyde to bring about condensation polymerization through the urea-amido hydrogens or (2) reaction with an aldehyde followed by addition polymerization of the vinyl group. The polymerization temperatures are those conventionally used in conducting these types of polymerization and will range from 25° C. to 150° C., although temperatures from 30° C. to 100° C. are preferred.

The polymers obtained from the vinylureas of this invention are useful in the preparation of coatings, molded products, and for modification of paper, textiles, or leather.

As many apparently widely different embodi-

I claim:
1. An N-vinylurea having the formula

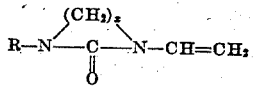

wherein $x$ is an integer from 2 to 3, inclusive, and R is from the group consisting of —H and —CH=CH$_2$.

2. The polymerization product of the N-vinylurea defined in claim 1.
3. N-monovinylethyleneurea.
4. Polymeric N-monovinylethyleneurea.
5. N,N'-divinylethyleneurea.
6. Polymeric N,N'-divinylethyleneurea.
7. Process for obtaining N-vinyl ureas which comprises reacting under basic conditions acetylene and a urea at a temperature of from 30° C. to the decomposition temperature of the urea, said urea being selected from the group consisting of ethyleneurea and propyleneurea.
8. The process set forth in claim 7 in which said urea is ethyleneurea.

THEODORE L. CAIRNS.

REFERENCES CITED

The following references are of record in the file of this patent:

UNITED STATES PATENTS

| Number | Name | Date |
| --- | --- | --- |
| 2,238,682 | Dykstra | Apr. 15, 1941 |
| 2,335,454 | Schuster | Nov. 30, 1943 |
| 2,373,136 | Hoover | Apr. 10, 1945 |

FOREIGN PATENTS

| Number | Country | Date |
| --- | --- | --- |
| 543,566 | Great Britain | Mar. 4, 1942 |